United States Patent
Chambers

(10) Patent No.: US 7,515,597 B1
(45) Date of Patent: Apr. 7, 2009

(54) DISTRIBUTED SWITCHING PLATFORM AND METHOD OF OPERATING THE SAME

(75) Inventor: L. David Chambers, Garland, TX (US)

(73) Assignee: EADS Telecom North America Inc., Addison, TX (US)

( * ) Notice: Subject to any disclaimer, the term of this patent is extended or adjusted under 35 U.S.C. 154(b) by 686 days.

(21) Appl. No.: 09/678,338

(22) Filed: Oct. 3, 2000

(51) Int. Cl.
  *H04L 12/64* (2006.01)
  *H04L 12/66* (2006.01)

(52) U.S. Cl. .................. 370/410; 370/401; 370/386; 370/419; 379/900

(58) Field of Classification Search ......... 370/351–356, 370/360, 367, 368, 371, 386, 396, 395.52, 370/400, 410, 216, 260, 270, 401, 419, 420; 379/219, 225, 420, 900; 709/201, 220, 226, 709/238, 328
See application file for complete search history.

(56) References Cited

U.S. PATENT DOCUMENTS

| | | | | |
|---|---|---|---|---|
| 5,495,484 | A * | 2/1996 | Self et al. | 370/338 |
| 5,742,596 | A * | 4/1998 | Baratz et al. | 371/356 |
| 5,815,667 | A | 9/1998 | Chien et al. | 395/200.62 |
| 5,862,344 | A | 1/1999 | Hart | 395/200.68 |
| 5,878,130 | A * | 3/1999 | Andrews et al. | 379/265.09 |
| 5,943,408 | A * | 8/1999 | Chen et al. | 379/216.01 |
| 6,026,086 | A | 2/2000 | Lancelot et al. | 370/353 |
| 6,026,087 | A | 2/2000 | Mirashrafi et al. | 370/389 |
| 6,049,545 | A * | 4/2000 | Stephenson et al. | 370/410 |
| 6,078,564 | A | 6/2000 | Lakshman et al. | 370/235 |
| 6,119,173 | A * | 9/2000 | Pullen et al. | 709/328 |
| 6,320,951 | B1 * | 11/2001 | Shtivelman et al. | 379/211.01 |
| 6,385,196 | B1 * | 5/2002 | Hayball et al. | 370/356 |
| 6,480,597 | B1 * | 11/2002 | Kult et al. | 379/242 |
| 6,496,508 | B1 * | 12/2002 | Breuckheimer et al. | 370/397 |
| 6,542,739 | B1 * | 4/2003 | Garner | 455/427 |
| 6,560,329 | B1 * | 5/2003 | Draginich et al. | 379/265.02 |
| 6,614,783 | B1 * | 9/2003 | Sonesh et al. | 370/352 |
| 6,614,902 | B1 * | 9/2003 | Rizzetto | 379/265.11 |
| 6,625,751 | B1 * | 9/2003 | Starovic et al. | 714/11 |
| 6,731,609 | B1 * | 5/2004 | Hirni et al. | 370/260 |
| 6,765,903 | B1 * | 7/2004 | Allen et al. | 370/365 |
| 6,779,020 | B1 * | 8/2004 | Henrick | 709/206 |
| 6,870,848 | B1 * | 3/2005 | Prokop | 370/395.2 |
| 7,016,341 | B2 * | 3/2006 | Potter et al. | 370/352 |
| 7,043,006 | B1 * | 5/2006 | Chambers et al. | 379/265.02 |
| 7,069,291 | B2 * | 6/2006 | Graves et al. | 709/201 |
| 7,164,694 | B1 * | 1/2007 | Nodoushani et al. | 370/467 |
| 7,302,054 | B1 * | 11/2007 | McNiff et al. | 379/268 |
| 7,471,787 | B2 * | 12/2008 | Chambers et al. | 379/265.02 |
| 2001/0024497 | A1 * | 9/2001 | Campbell et al. | 379/265.09 |
| 2003/0128698 | A1 * | 7/2003 | Darland et al. | 370/360 |
| 2005/0021713 | A1 * | 1/2005 | Dugan et al. | 709/223 |

* cited by examiner

*Primary Examiner*—Chi H Pham
*Assistant Examiner*—Ahmed Elallam
(74) *Attorney, Agent, or Firm*—Groover & Associates

(57) ABSTRACT

A distributed switching platform coupled to an Internet Protocol (IP) network and a method of operating the same. In one embodiment, the distributed switching platform includes a main control unit (MCU), coupled to the IP network, that generates call and control processing commands. The distributed switching platform also includes a switching partition coupled to the IP network. The switching partition includes an input-output distributor (IOD) and a circuit-switched matrix and line interface, coupled to the IOD, that provides an interface to a plurality of access nodes. The IOD conveys the call and control processing commands to the circuit-switched matrix and line interface to allow the circuit-switched matrix and line interface to control access to the plurality of access nodes.

36 Claims, 6 Drawing Sheets

DISTRIBUTED SWITCHING PLATFORM AND METHOD OF OPERATING THE SAME

TECHNICAL FIELD OF THE INVENTION

The present invention is directed, in general, to communications systems and, more specifically, to a distributed switching platform for a communications network and a method of operating the same.

BACKGROUND OF THE INVENTION

Conventional switching platforms are advantageously employed in telecommunications systems to facilitate, for instance, private branch exchange (PBX) administered interoffice communications or switching and call queuing functionality for a call center. Call centers are employed in a multitude of applications such as telemarketing, customer service and sales support applications. A call center is typically embodied in a central location wherein inbound and outbound calls are processed by an organization in association with computer automation. The call center generally employs a number of agents who communicate with customers via telephone, facsimile, electronic mail, or other communication techniques or devices. The call center has the ability to handle a considerable volume of communication traffic at the same time in association with automation techniques such as call routing and equitable distribution, call screening, agent skill matching, and other resource optimization and management reporting functionality.

A switching platform employable with a call center typically includes a computer server system that provides call and control processing functions for the call center. The computer server system may employ a number of input-output distributor (IOD) cards connectable via a multibus interface. Each IOD card provides an interface from a main control unit (MCU) to a switching matrix, which is capable of controlling a number of line cards. The line cards provide the physical interface to access nodes, which may include digital and analog instruments and digital and analog trunks.

The switching platforms generally employ a hub and spoke topology wherein the computer server system (the hub) distributes communication traffic to a number of switching matrices (the spokes) at a number of sites. The distribution capability of the switching platform enables overflow traffic from one site to be distributed to other sites as needed.

The hub and spoke topology, however, suffers from a number of deficiencies. More specifically, the computer server system must be located proximate to the IODs due to the limited distance capability of the multibus interface. Moreover, for reasons that will become more apparent, the hub and spoke topology does not readily address the continuing availability of the unified switching platform should the centralized hub site experience a failure.

Inasmuch as call centers represent a significant investment in advancing the quality of the customer interface with a business and in providing connectivity for a source of revenue for the business, it is essential that the call centers be highly fault tolerant. In an attempt to address the aforementioned predicament, the computer server system of the switching platform employed with most call centers generally includes primary and secondary controllers, referred to as a redundant pair of master control units (MCUs).

Typically, the MCUs are tightly connected by proprietary intermachine communication methods and protocols to ensure that one of the controllers operates as the primary controller (or in the master mode) and the other controller acts as the secondary controller (or in the standby mode). The secondary controller assumes control of the call center in the event that the primary controller experiences difficulty. Although the MCUs can interchange roles, it is common to designate one of the controllers as the primary controller for a given period of time.

While the redundant pair of MCUs affords a degree of fault tolerance, the system suffers from a few limitations. First, restrictions associated with the intermachine data communication methods and protocols (including operational data synchronization) makes it necessary to locate the redundant pair of MCUs within close proximity to one another. Of course, locating the MCUs in close proximity detracts from the fault tolerance ability of the system. Another limitation associated with the system is that the MCUs also should be located in close proximity to the other major components of the switching platform due, in part, to the communications system architecture associated with the MCUs. Thus, the hub-based design of the switching platform cannot accommodate a truly distributed architecture (whereby the integrity of the telecommunications system is not dependent on the operation of a centralized site or hub) thereby further limiting the fault tolerant nature thereof.

Accordingly, what is needed in the art is a switching platform that overcomes the deficiencies of the prior art.

SUMMARY OF THE INVENTION

To address the above-discussed deficiencies of the prior art, the present invention provides a distributed switching platform coupled to an Internet Protocol (IP) network and a method of operating the same. In one embodiment, the distributed switching platform includes a main control unit (MCU), coupled to the IP network, that generates call and control processing commands. The distributed switching platform also includes a switching partition coupled to the IP network. The switching partition includes an input-output distributor (IOD) and a circuit-switched matrix and line interface, coupled to the IOD, that provides an interface to a plurality of access nodes. The IOD conveys the call and control processing commands to the circuit-switched matrix and line interface to allow the circuit-switched matrix and line interface to control access to the plurality of access nodes.

The present invention introduces, in one aspect, a distributed switching platform employable in a packet network and, preferably, an IP network. The switching platform includes a switching partition having a circuit-switched matrix and line interface to provide connectivity to a circuit switched environment over a packet-based network (via an IOD). Thus, the switching platform provides the advantages normally associated with a circuit switched environment, while, at the same time, transporting communications control data packets containing call set-up/tear-down and other interim and related call processing and control messages over a packet network.

In one embodiment of the present invention, the MCU and the switching partition communicate employing a User Datagram Protocol (UDP). The use of a standard protocol, such as UDP/IP, provides for compatibility with a wide variety of network connectivity.

In one embodiment of the present invention, the MCU and the switching partition are geographically separable. By employing the IP network, the MCU and the switching partition may be physically located in geographically disparate locations while retaining the ability to communicate with each other. The truly distributed nature of the switching platform allows system components associated therewith to be geographically separable thereby bolstering the reliability of a call center employing the switching platform (i.e., making centralized control functionally independent of a single physical location).

In one embodiment of the present invention, ones of the plurality of access nodes are selected from the group consisting of: (1) a digital instrument; (2) an analog instrument; (3) a digital trunk; and (4) an analog trunk. The digital instrument may be a digital station set or a computer equipped for voice communications via a digital circuit. Of course, the instrument may be any station set or computer equipped for voice communications via a station circuit. Additionally, the access nodes may be trunks leading to, for instance, the Public Switch Telephone Network (PSTN). In other words, any access node, either a destination device, path or telephony resource (such as a dual tone multi-frequency receiver, conference bridge or tone plant) are well within the broad scope of the present invention.

In one embodiment of the present invention, the distributed switching platform further includes an application server coupled to the MCU via the IP network. Those skilled in the pertinent art are familiar with other devices (or software applications) that may be employed with the distributed switching platform of the present invention.

In one embodiment of the present invention, the MCU is a primary MCU. The distributed switching platform further includes a secondary MCU coupled to the IP network. The primary and secondary MCUs may be geographically separated over the IP network. The primary and secondary MCUs may thus be operated as a redundant pair to increase availability of the distributed switching platform.

In a related embodiment, the distributed switching platform may further include a plurality of MCUs coupled to the IP network. The presence of a multitude of MCUs may provide the distributed switching platform with disaster tolerance. More specifically, in addition to the set-up/tear-down and other call processing and control messaging, the IP network can accommodate data associated with station databases, call routing table updates and other data necessary to synchronize the operation of the plurality of MCUs.

As a result, the plurality of MCUs can be geographically separated across the IP network.

In relation to the aforementioned embodiments, it is preferable that only one of the primary and secondary MCUs provides the call and control processing commands at any given time. The MCU in control of distributed switching platform may be referred to as the ONLINE or PRIMARY MCU, while the other MCU may be referred to as the STANDBY or SECONDARY MCU. The ONLINE MCU, which is in control of the distributed switching platform, may update a database of the STANDBY MCU, which is not in control of the distributed switching platform, such that the STANDBY MCU may assume control of the distributed switching platform upon failure of the ONLINE MCU.

In one embodiment of the present invention, the distributed switching platform further includes a second switching partition coupled to the IP network. The second switching partition includes a second IOD and a second circuit-switched matrix and line interface, coupled to the IOD, that provides an interface to the plurality of access nodes or a plurality of other access nodes. Additionally, the distributed switching platform may include a plurality of switching partitions. Again, the truly distributed nature of the switching platform allows for any number of switching partitions, which may be geographically separated within the IP network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
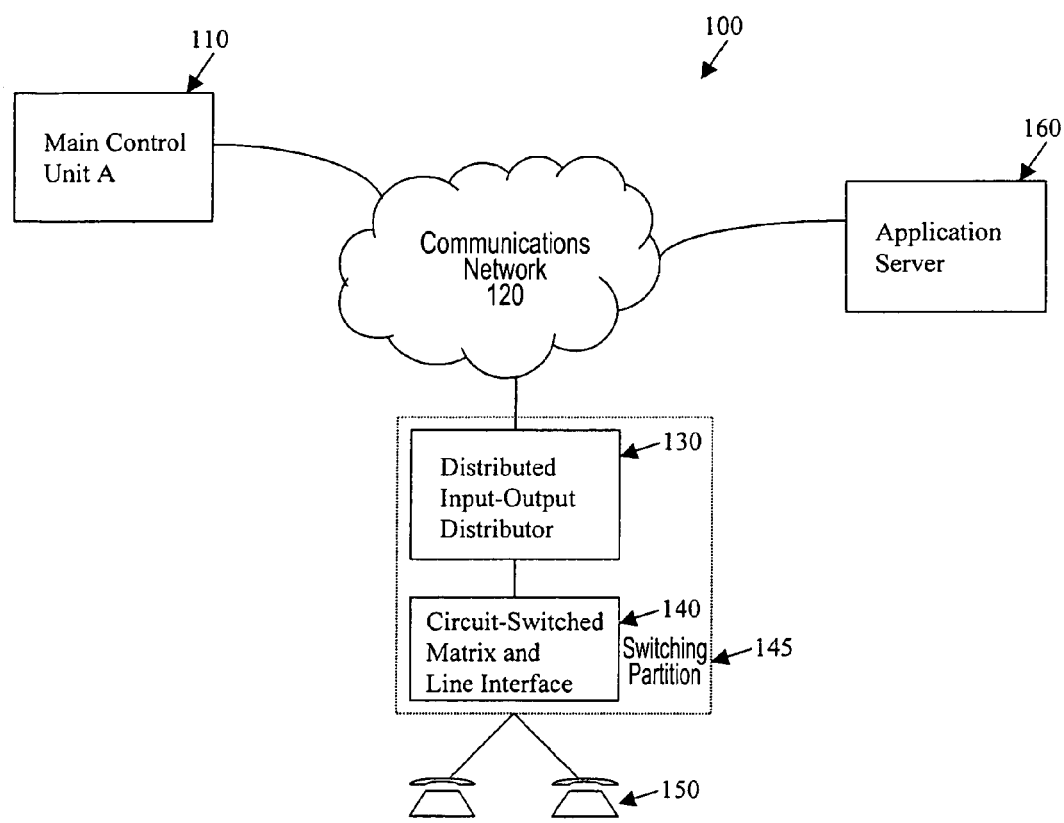
FIG. 1 illustrates a block diagram of an embodiment of a distributed switching platform constructed in accordance with the principles of the present invention.

Referring initially to FIG. 1, illustrated is a block diagram of an embodiment of a distributed switching platform 100 constructed in accordance with the principles of the present invention. The switching platform 100 is employable in, without limitation, enterprise systems such as a private branch exchange (PBX) system or as a call center. The switching platform 100 includes a main control unit (MCU) 110 that performs call and control processing functions for the system. The MCU 110 is coupled to a communications network {e.g., a packet network such as an Internet Protocol (IP) network 120} and employs the IP network 120 for communications with other portions of the switching platform 100. In the illustrated embodiment, the MCU includes an Ethernet interface and employs a User Datagram Protocol/Internet Protocol (UDP/IP) as a protocol by which data is sent over the Ethernet interface and the IP network 120.

For instance, the UDP/IP frame may be designed as set forth below.

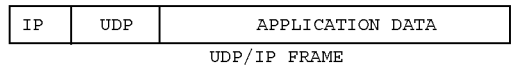

UDP/IP FRAME

The application data may encompass call and control processing commands for use by a switching partition 145 and the header information includes the UDP/IP information for transmission across the IP network 120. For a better understanding of packet-based network protocols see *TCP/IP Illustrated*, by Gary R. Wright and W. Richard Stevens, Addison-Wesley Professional Computing Series (volume 2 1995), which is incorporated herein by reference.

The switching platform 100 further includes an input-output distributor (IOD) 130 coupled to the IP network 120. In the illustrated embodiment, the IOD includes an Ethernet interface and employs UDP/IP as a transmission protocol over the Ethernet interface and the IP network 120. The IOD 130 may thus be referred to as an Internet Protocol (IP) distributed IOD.

The switching platform 100 further includes a circuit-switched matrix and line interface 140 coupled to the IOD 130. The switching matrix and line interface 140 provides an interface to a plurality of access nodes, generally designated 150. The access nodes 150 may include digital or analog instruments, such as digital or analog telephony devices, trunks (digital or analog) or any telephony resource (e.g., a conference bridge).

The MCU 110 generates call and control processing commands (such as call set-up and tear-down commands) that are employed to control access to the access nodes 150 via the IOD 130 and the circuit-switched matrix and line interface 140. In the illustrated embodiment, the IOD 130 is employable to distribute a large number of time-slots from the MCU 110 to the access nodes 150.

The IOD 130 and the circuit-switched matrix and line interface 140 together form the switching partition 145. While the IOD 130 and the circuit-switched matrix and line interface 140 are illustrated as discrete sections of the switching partition 145, the functionality associated with the sections may be embodied in an integrated section. Since the switching partition 145 (via the IOD 130) employs UDP/IP for communication with the MCU 110 via the IP network 120, the switching partition 145 may be physically separate from the MCU 110, i.e., at a different geographical location. Further, in one embodiment, the link between the MCU 110 and the switching partition 145 may be scalable. The bandwidth required between the MCU 110 and the switching partition 145 may thus be adjusted as necessary, based, for example, on the number of access nodes 150 connected to the switching partition 145.

In the illustrated embodiment, the switching platform 100 further includes an application server 160 coupled to the IP network 120. The application server 160 may communicate with the MCU 110 via the IP network 120 or may be implemented in software executable within the MCU 110. The application server 160 may provide application specific functionality such as predictive dialing and agent automatic call distribution monitoring and status functionality for the switching platform 100. Those skilled in the art are familiar with other applications (such as a Simple Network Management Protocol application) that may be employed with the switching platform 100 of the present invention.

Figure 2:
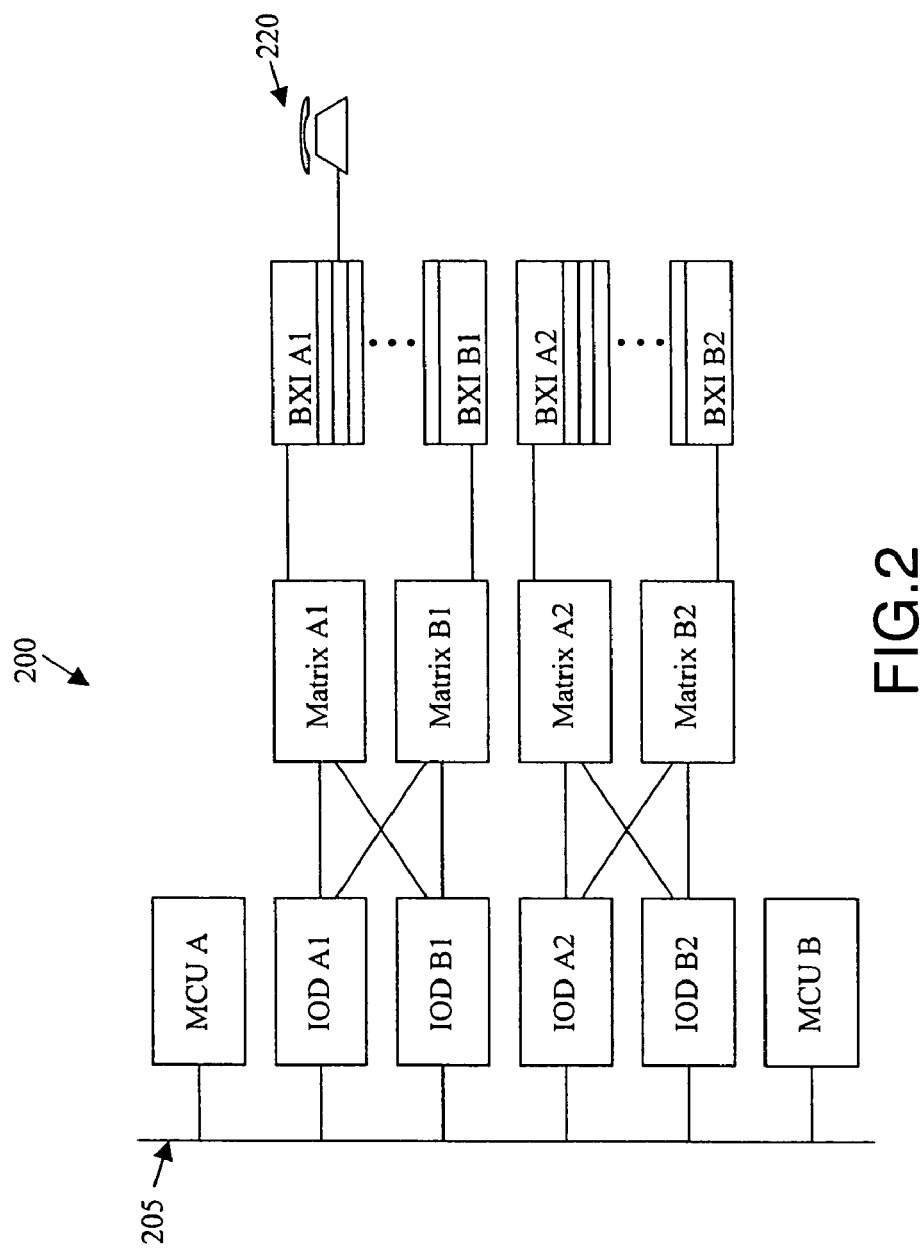
FIG. 2 illustrates a block diagram of another embodiment of a distributed switching platform constructed in accordance with the principles of the present invention.

Turning now to FIG. 2, illustrated is a block diagram of another embodiment of a distributed switching platform 200 constructed in accordance with the principles of the present invention. The switching platform 200 includes a MCU A coupled to an IP network 205 (represented as an interconnect bus). The switching platform 200 further includes a MCU B, also coupled to the IP network 205. The MCUs (MCU A, MCU B) can perform call and control processing functions for the switching platform 200. The MCUs (MCU A, MCU B) cooperate to form a redundant pair, thus providing the switching platform 200 with disaster tolerance when one of the MCUs (MCU A, MCU B) has failed.

In the illustrated embodiment, each of the MCUs (MCU A, MCU B) has an Ethernet interface. The MCUs (MCU A, MCU B) employ the Ethernet interface to form an information link (not shown) therebetween. The information link may advantageously provide the functions of both a communications link and an inter-processor link, which had previously been implemented with two separate physical links. The MCUs (MCU A, MCU B) may thus be coupled to each other and to other computer servers via the Ethernet interface, employing, for example, a Transport Control Protocol (TCP)/IP. Thus, any connectivity links between the MCUs (MCU A, MCU B) may employ and take advantage of TCP/IP.

The switching platform 200 further includes a number of input-output distributors (IODs) coupled to the IP network 205. More specifically, the switching platform 200 includes first and second IODs (IOD A1, IOD A2) associated with MCU A. The switching platform 200 further includes first and second IODs (IOD B1, IOD B2) associated with MCU B. The switching platform 200 further includes first, second, third and fourth circuit-switched matrices and line interfaces (Matrix A1, Matrix B1, Matrix A2, Matrix B2), each respectively associated with one of the first and second IODs (IOD A1, IOD B1, IOD A2, IOD B2). Of course, the switching platform 200 may include additional IODs and circuit-switched matrices and line interfaces and remain well within the broad scope of the present invention.

MCU A can provide call and control processing commands to the first and second IODs (IOD A1, IOD A2). The first IOD (IOD A1) is coupled to the first circuit-switched matrix and line interface (Matrix A1) and is further coupled to the second circuit-switched matrix and line interface (Matrix B1). The second IOD (IOD A2) is coupled to the third circuit-switched matrix and line interface (Matrix A2) and is further coupled to the fourth circuit-switched matrix and line interface (Matrix B2). MCU A may thus perform call and control processing functions for the first, second, third and fourth circuit-switched matrices and line interfaces (Matrix A1, Matrix A2, Matrix B1, Matrix B2) via the first and second IODs (IOD A1, IOD A2).

Analogously, MCU B can provide call and control processing commands to the first and second IODs (IOD B1, IOD B2). The first IOD (IOD B1) is coupled to the first circuit-switched matrix and line interface (Matrix A1) and is further coupled to the second circuit-switched matrix and line interface (Matrix B1). The second IOD (IOD B2) is coupled to the third circuit-switched matrix and line interface (Matrix A2) and is further coupled to the fourth circuit-switched matrix and line interface (Matrix B2). MCU B may thus perform call and control processing functions for the first, second, third and fourth circuit-switched matrices and line interfaces (Matrix A1, Matrix A2, Matrix B1, Matrix B2) via the first and second IODs (IOD B1, IOD B2).

It should be understood from the illustrated embodiment, however, that MCU A may perform call and control processing functions for the first, second, third and fourth circuit-switched matrices and line interfaces (Matrix A1, Matrix A2, Matrix B1, Matrix B2) via the first and second IODs (IOD B1, IOD B2). Additionally, MCU B may perform call and control processing functions for the first, second, third and fourth circuit-switched matrices and line interfaces (Matrix A1, Matrix A2, Matrix B1, Matrix B2) via the first and second IODs (IOD A1, IOD A2). Again, the system architecture facilitates disaster tolerance for the switching platform 200.

In the illustrated embodiment, only one of the MCUs (MCU A, MCU B) provides call and control processing commands at any given time. The MCU in control of the switching platform 200 may be referred to as the ONLINE or PRIMARY MCU, while the other MCU may be referred to as the STANDBY or SECONDARY MCU. The topology of the present invention allows either of the MCUs (MCU A, MCU B) to operate as the primary MCU in controlling the first, second, third and fourth circuit-switched matrices and line interfaces (Matrix A1, Matrix B1, Matrix A2, Matrix B2).

The switching platform 200 further includes first and second Bus exchange Interface (BXI) cards (BXI A1, BXI B1)

associated with the first and second circuit-switched matrices and line interfaces (Matrix A1, Matrix B1), respectively. The first and second BXI cards (BXI A1, BXI B1) redundantly control a plurality of line cards (line interfaces) associated with the first and second circuit-switched matrices and line interfaces (Matrix A1, Matrix B1). Each line card is coupled to an access node 220, one of which is illustrated. The switching platform 200 still further includes third and fourth Bus exchange Interface (BXI) cards (BXI A2, BXI B2) associated with the third and fourth circuit-switched matrices (Matrix A2, Matrix B2), respectively.

Analogous to the first and second BXI cards (BXI A1, BXI B1), the third and fourth BXI cards (BXI A2, BXI B2) also redundantly control a plurality of line cards associated with third and fourth circuit-switched matrices (Matrix A2, Matrix B2). The failure of the first or second circuit-switched matrices (Matrix A1, Matrix B1) will, therefore, have no effect on the functionality of the access node 220. Additionally, the system architecture is scalable to accommodate a plurality of system components. For instance, each of the circuit-switched matrices and line interfaces (generally designated Matrix "n") can accommodate a plurality of BXI cards ((generally designated BXI "n") which in turn can accommodate a plurality of access nodes.

Figure 3:
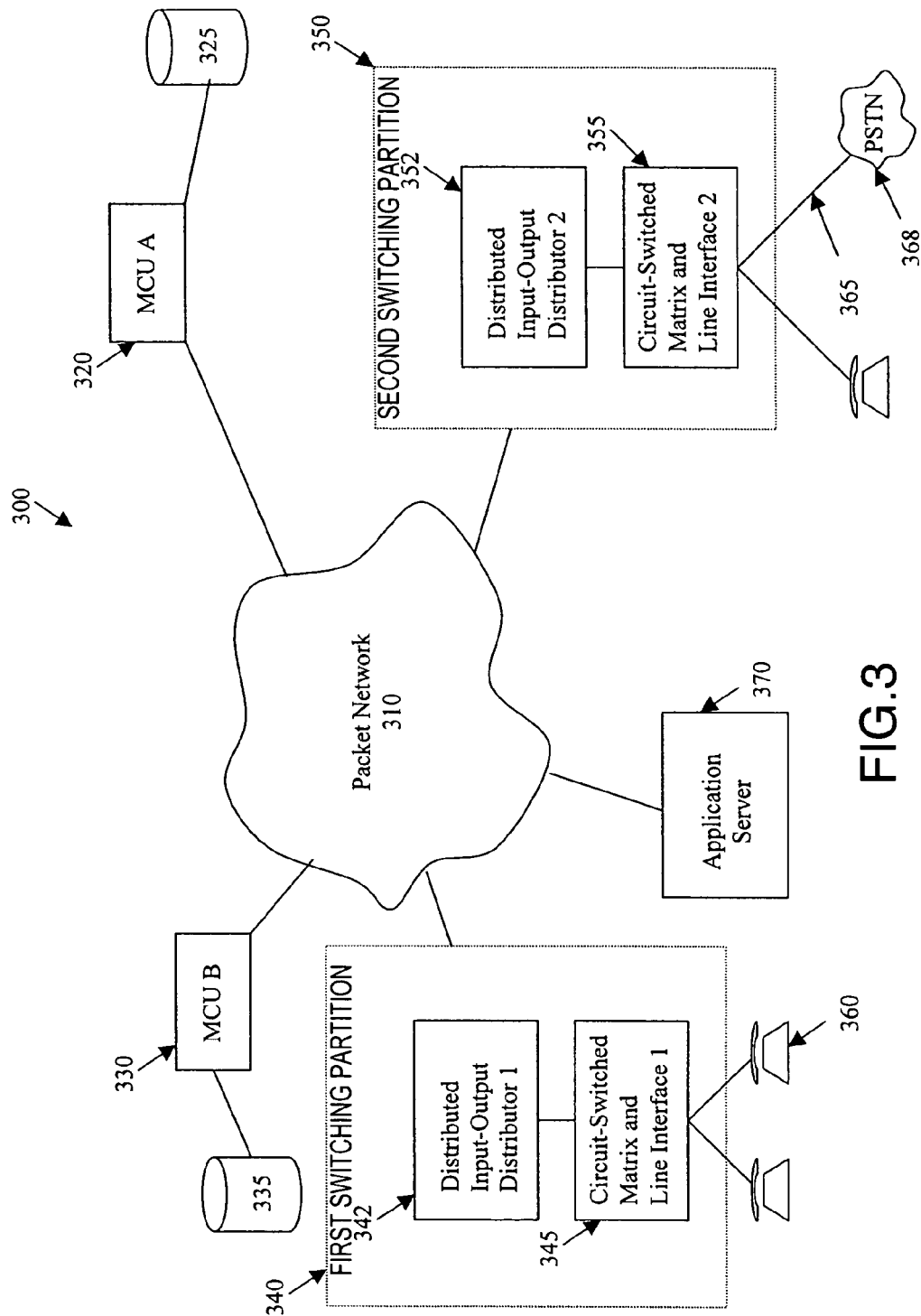
FIG. 3 illustrates a block diagram of an embodiment of an enterprise call center constructed in accordance with the principles of the present invention.

Turning now to FIG. 3, illustrated is a block diagram of an embodiment of an enterprise call center 300 constructed in accordance with the principles of the present invention. The call center 300 employs a packet network (e.g., an IP network) 310 for communications between its various constituent devices. In the illustrated embodiment, the IP network 310 may be a local area network (LAN), wide area network (WAN) or another type of packet switched network.

The call center 300 includes a plurality of main control units {two of which are illustrated as primary and secondary MCUs (MCU A, MCU B)} coupled to the IP network 310. The primary and secondary MCUs (MCU A, MCU B) include corresponding first and second databases 325, 335, respectively. Again, the primary MCU (MCU A), which is in control of the call center 300, may update the database 335 of the secondary MCU (MCU B), which is not in control of the call center 300, such that the secondary MCU (MCU B) may assume control of the call center 300 upon failure of the primary MCU (MCU A). The architecture is flexible and scalable to accommodate a plurality of MCUs or other devices, for that matter.

The call center 300 further includes first and second switching partitions 340, 350 coupled to the IP network 310. The first switching partition 340 includes a first Distributed Input-Output Distributor (DIOD) 342 associated with a first circuit-switched matrix and line interface 345, which may, in turn be coupled to a plurality of access nodes (one of which is designated as 360). The second switching partition 350 includes a second DIOD 352 associated with a second circuit-switched matrix and line interface 355, which may, in turn be coupled to a plurality of access nodes {one of which is designated as a trunk 365 coupled to another communications network such as the Public Switch Telephone Network (PSTN)}.

The call center 300 further includes an application server 370. The application server 370 is coupled to the IP network 310 and communicates with the primary and secondary MCUs (MCU A, MCU B) via the IP network 310. Those skilled in the art are familiar with other applications that may be employed with the call center 300 of the present invention.

The call center 300 advantageously employs the IP network 310 to allow its constituent devices to communicate via the IP network, regardless of a location of a particular device. The primary and secondary MCUs (MCU A, MCU B) and the first and second switching partitions 340, 350 may thus be placed in a geographically separate location, while retaining the functionality of an integrated call center.

Figure 4A:
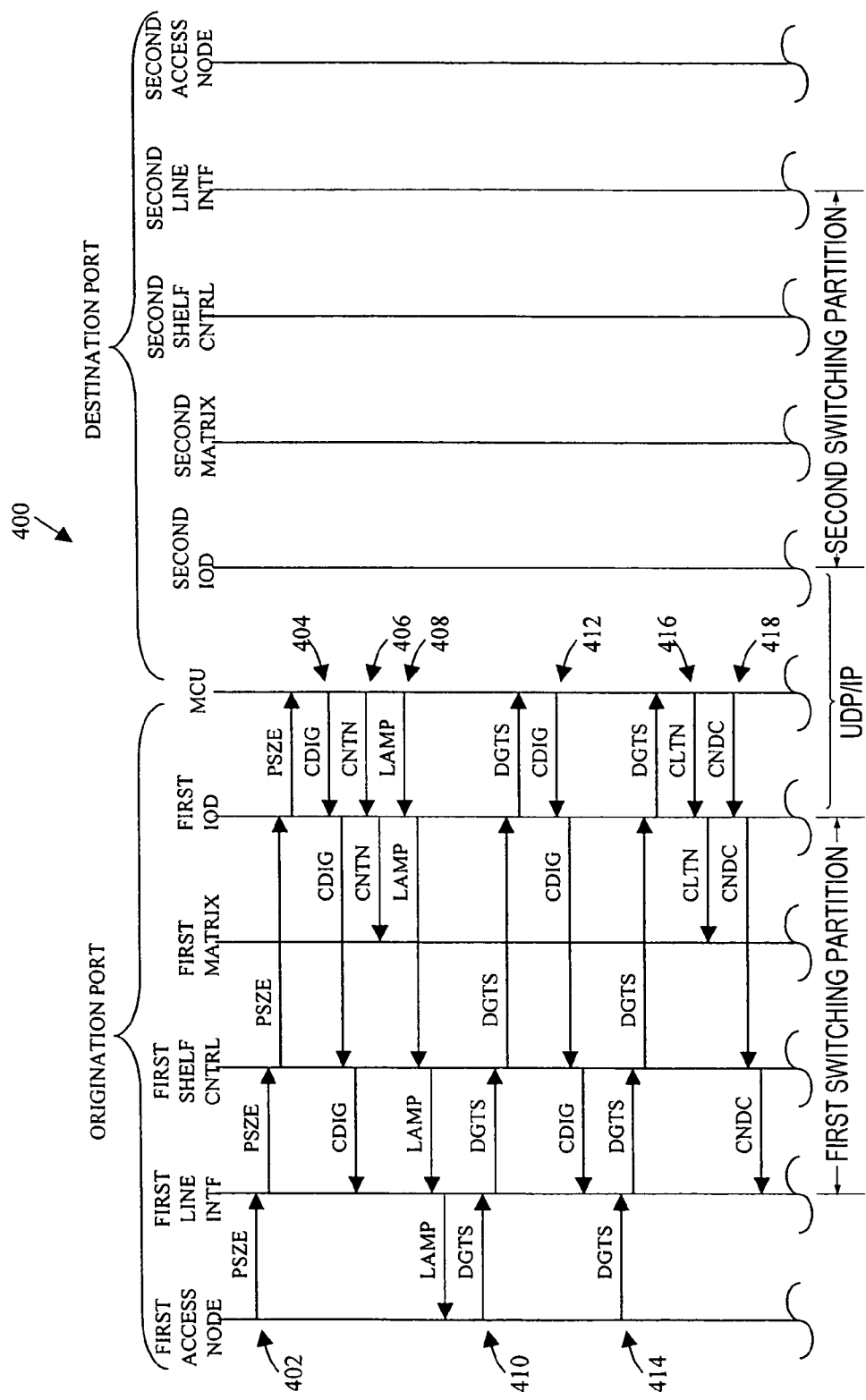
FIGS. 4A-4C illustrate flow diagrams of an exemplary call set-up and tear-down sequence constructed in accordance with the principles of the present invention.
Figure 4B:
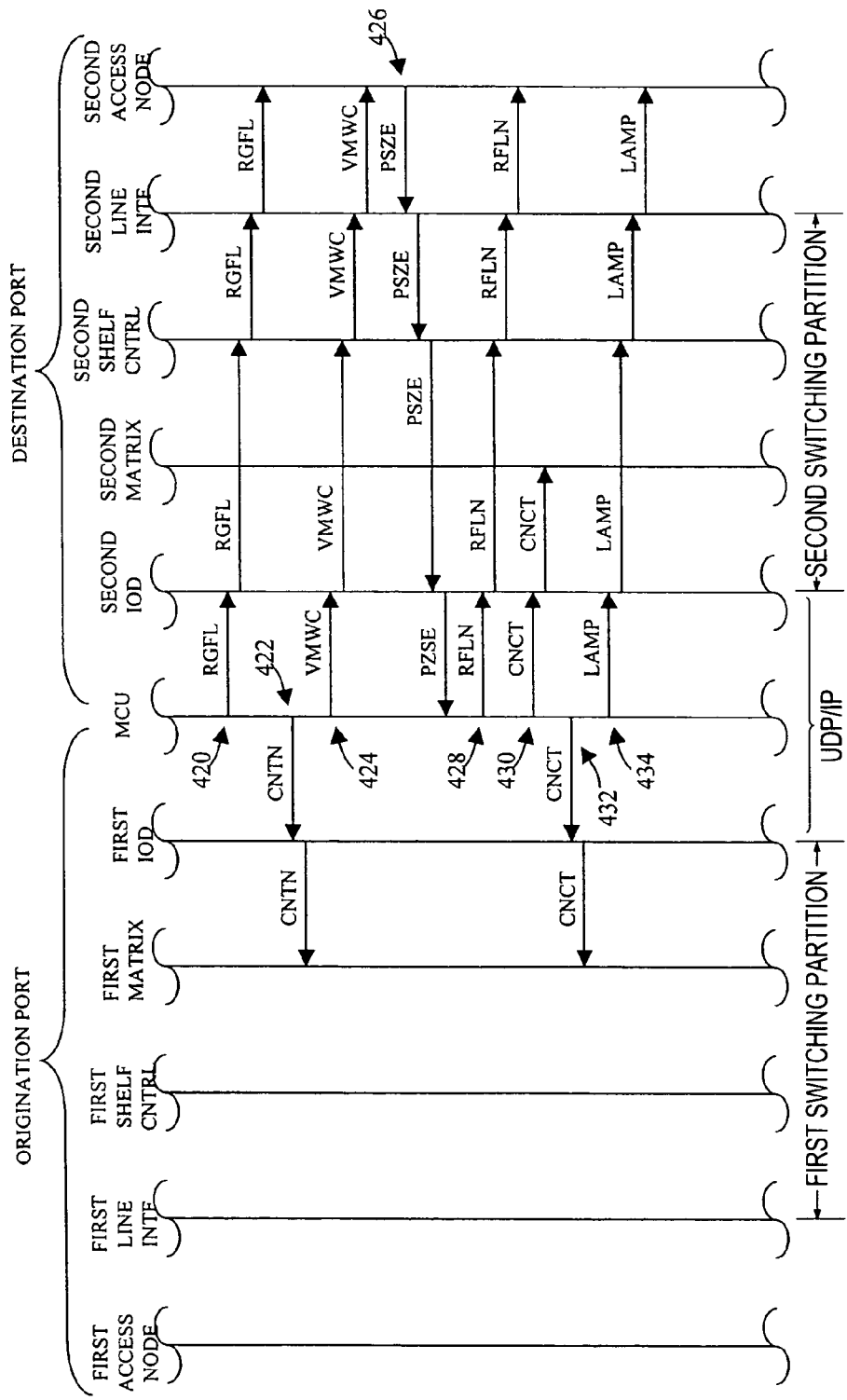
Figure 4C:
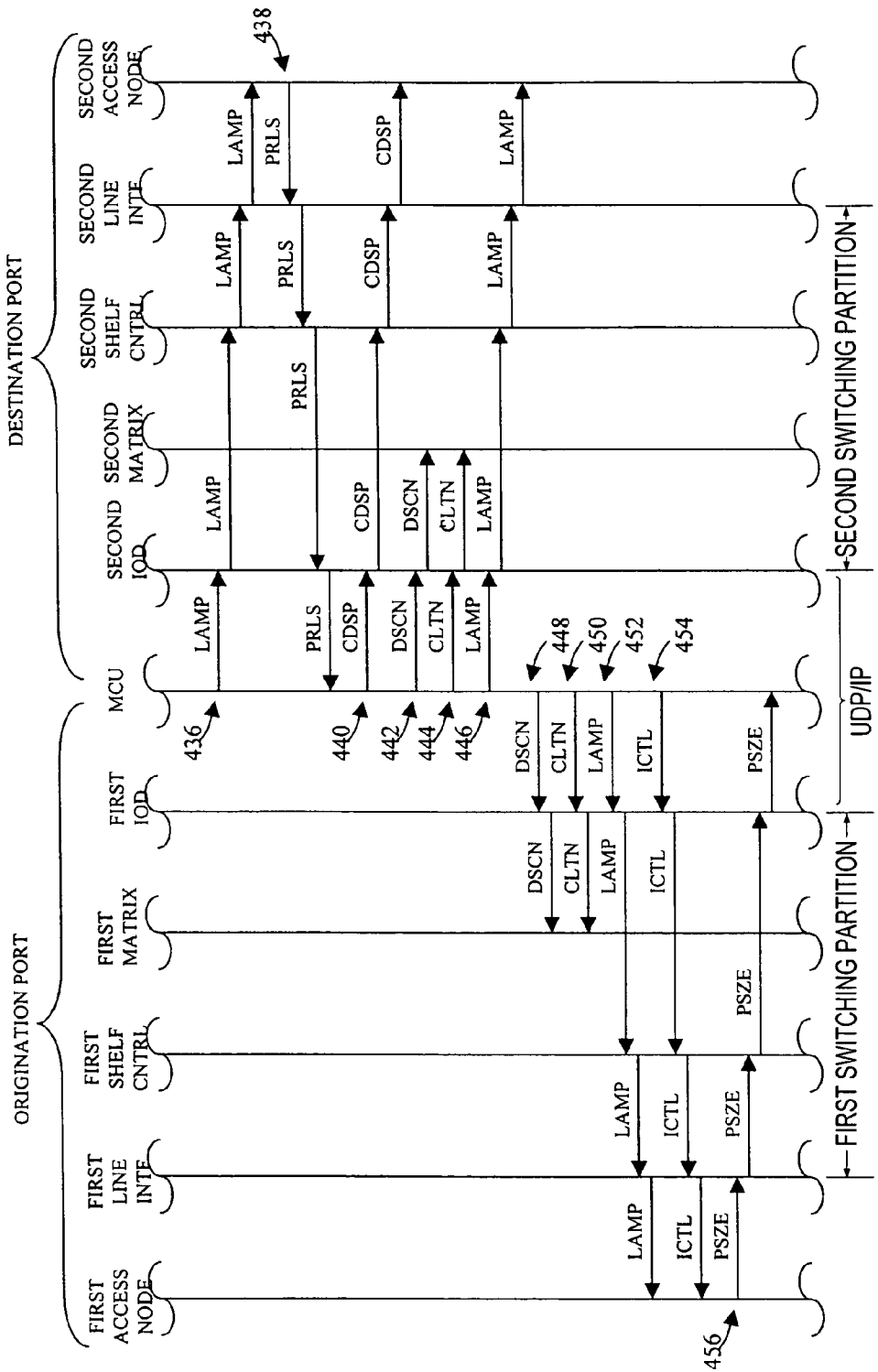

Turning now to FIGS. 4A-4C, illustrated are a flow diagram of an exemplary call set-up and tear-down sequence 400 constructed in accordance with the principles of the present invention. The sequence 400 illustrates the flow of call and control processing commands between a first access node (e.g., a first station), a first switching partition (illustrated separately as a first line interface, first shelf controller, first circuit-switched matrix and first IOD) a MCU, a second switching partition (illustrated separately as a second IOD, second circuit-switched matrix, second shelf controller and second line interface), and a second access node (e.g., a second station). In the illustrated embodiment, all communications between the MCU and the IOD(S) associated with the first and second switching partitions are performed using a packet based protocol such as UDP/IP. The communications associated with the first and second switching partitions and first and second access nodes are performed in a circuit-switched based environment. Additionally, while the present embodiment illustrates a communications session between access nodes directly connected to the switching partitions, the principles of the present invention are equally applicable to other types of communications sessions including ones that facilitate communication between access nodes to other communications networks.

The sequence 400 begins as the first station at the first access node goes off hook. In a step 402, a port seize (PSZE) signal is transmitted from the first access node to the first line interface, the first shelf controller, the first IOD and the MCU. The MCU responds (in a step 404) by sending a collect digits (CDIG) signal to the first IOD, the first shelf controller and the first line interface. Then, in a step 406, the MCU sends a connect tone (CNTN) signal to the first IOD and the first circuit-switched matrix. The connect tone (CNTN) signal directs the first circuit-switched matrix to connect an ear of the first station to a tone generator to allow a first user to hear a dial tone. In a step 408, the MCU sends a phone lamp control (LAMP) signal to the first IOD, the first shelf controller, the first line interface and the first access node. The first user may thus see certain lamps of the first station light up, indicating that the first station is operational.

As the first user dials the first station, in a step 410, the first access node sends a digits (DGTS) signal to the first line interface, the first shelf controller, the first IOD and the MCU. In a step 412, the MCU responds by sending a collect digits (CDIG) signal back to the first IOD, the first shelf controller, the first line interface and the first access node. As the first user continues to dial, the first access node, in a step 414, sends a further digits (DGTS) signal to the first line interface, the first shelf controller, the first IOD and the MCU. At this point, in a step 416, the MCU sends a clear tone (CLTN) signal to the first circuit-switched matrix, causing the first circuit-switched matrix to disconnect the ear of the first station from the tone generator. As those skilled in the pertinent art realize, once a user begins dialing on a conventional station set, the dial tone can no longer be heard. Then, once all the required digits have been dialed, in a step 418, the MCU sends a cancel digit collect (CNDC) signal to the first IOD, the first shelf controller and the first line interface.

Next, in a step 420, the MCU sends a ring control (RGFL) signal to the second IOD, the second shelf controller, the second line interface and the second access node. The second station may now begin ringing. Then, in a step 422, the MCU sends a connect tone (CNTN) signal to the first IOD and the first circuit-switched matrix associated with the first access node. The first user may now hear a tone indicating the station set that he has dialed is ringing. In a step 424, the MCU sends phone display control (VMWC) signals to the second IOD, the second shelf controller, the second line interface and the second access node. The dialed station may now display information, such as caller ID, etc.

As a second user picks up the dialed station, in a step 426, the second access node sends a port seize (PSZE) signal to the second line interface, the second shelf controller, the second IOD and the MCU. The MCU responds, in a step 428, by sending a ring control (RFLN) signal to the second IOD, the second shelf controller, the second line interface and the second access node. The second station may now stop ringing.

Then, in a step 430, the MCU sends a connect time-slot (CNCT) signal to the second IOD and the second circuit-switched matrix associated with the second access node. In a step 432, the MCU also sends a connect time-slot (CNCT) signal to the first IOD and the first circuit-switched matrix associated with the first access node. The ear of the first station may thus be connected to the mouth of second station and vice versa to facilitate communications between the first and second access nodes. In steps 434 and 436, the MCU sends phone lamp control (LAMP) signals to the second IOD, the second shelf controller, the second line interface and the second access node.

Once the conversation has ended, the second user may hang up the second station. In a step 438, the second access node sends a port release (PRLS) signal to the second line interface, the second shelf controller, the second IOD and the MCU. In a step 440, the MCU sends a clear display (CDSP) signal to the second IOD, the second shelf controller, the second line interface and the second access node. The display of the second station may thus be cleared to indicate that the call is over. Then, in a step 442, the MCU sends a disconnect time-slot (DSCN) signal to the second IOD and the second circuit-switched matrix associated with the second access node. In a step 444, the MCU also sends a clear tone (CLTN) signal to the second IOD and the second circuit-switched matrix associated with the second access node. In a step 446, the MCU sends phone lamp control (LAMP) signals to the second IOD, the second shelf controller, the second line interface and the second access node.

Next, in a step 448, the MCU now sends a disconnect time-slot (DSCN) signal to the first IOD and the first circuit-switched matrix associated with the first access node. In a step 450, the MCU also sends a clear tone (CLTN) signal to the first IOD and the first circuit-switched matrix associated with the first access node. In a step 452, the MCU sends phone lamp control (LAMP) signals to the first IOD, the first shelf controller, the first line interface and the first access node. Then, in a step 454, the MCU sends phone display control (ICTL) signals to the first IOD, the first shelf controller, the first line interface and the first access node. As the first user hangs up, the first access node, in a step 456, sends a port release (PRLS) signal to the first line interface, the first shelf controller, the first IOD and the MCU. Call tear-down is now complete.

Thus, the control to allow the two geographically disparate access nodes to communicate has been accomplished transparently via a packet network (e.g., an IP network). Thus, the distributed switching platform takes advantage of the benefits of the circuit-switched and packet environment at the same time. Additionally, the switching platform is scalable and truly capable of being distributed thereby providing a very reliable network switching platform.

It should be understood, that the embodiments of the distributed switching platform illustrated and described with respect to the preceding FIGURES are submitted for illustrative purposes only and other configurations compatible with the principles of the present invention may be employed as the application dictates. Also, it should be understood that the systems associated with the present invention may be embodied in software, dedicated or hardwired discrete or integrated circuitry, or combinations thereof.

For a better understanding of conventional computer systems architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993) and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, McGraw Hill (3rd ed. 1997). Each of the foregoing publications is incorporated herein by reference for all purposes.

Although the present invention has been described in detail, those skilled in the art should understand that they can make various changes, substitutions and alterations herein without departing from the spirit and scope of the invention in its broadest form.

What is claimed is:

1. A distributed switching platform coupled to an Internet Protocol (IP) network, comprising:
    a main control unit (MCU) coupled to said IP network and configured to generate call and control processing commands;
    a switching partition coupled to said IP network and including:
        an input-output distributor (IOD) configured to receive said call and control processing commands in a packet based protocol, and
        a circuit-switched matrix and line interface coupled to said IOD and configured to provide a sole interface between a plurality of access nodes and said MCU, said IOD configured to convey said call and control processing commands to said circuit-switched matrix and line interface to allow, based thereon, said circuit-switched matrix and line interface to control access to said plurality of access nodes, wherein each connection between said access nodes and said MCU traverses said circuit-switched matrix and line interface; and
    wherein ones of said plurality of access nodes are selected from the group consisting of:
    a digital instrument;
    a digital trunk; and
    an analog trunk.

2. The distributed switching platform as recited in claim 1 wherein said MCU and said switching partition are adapted to communicate employing a User Datagram Protocol (UDP).

3. The distributed switching platform as recited in claim 1 wherein said MCU and said switching partition are geographically separable.

4. The distributed switching platform as recited in claim 1 further comprising an application server coupled to and configured to communicate with said MCU.

5. The distributed switching platform as recited in claim 1 wherein said MCU is a primary MCU, said distributed switching platform further comprising a secondary MCU couplable to said IP network.

6. The distributed switching platform as recited in claim 5 wherein said primary and secondary MCUs are geographically separable.

7. The distributed switching platform as recited in claim 5 wherein only one of said primary and secondary MCUs is configured to provide said call and control processing commands at any time, said one of said primary and secondary MCUs being in control of said distributed switching platform.

8. The distributed switching platform as recited in claim 7 wherein said one of said primary and secondary MCUs which is in control of said distributed switching platform is configured to update a database associated with said other one of said primary and secondary MCUs.

9. The distributed switching platform as recited in claim 1 further comprising a second switching coupled to said IP network and including:
a second IOD, and
a second circuit-switched matrix and line interface coupled to said second IOD and configured to provide an interface to additional access nodes.

10. A method of operating a distributed switching platform coupled to an Internet Protocol (IP) network, comprising:
generating call and control processing commands with a main control unit (MCU) coupled to said IP network;
coupling an input-output distributor (IOD) to said IP network;
providing a sole interface between a plurality of access nodes and said MCU via a circuit-switched matrix and line interface coupled to said IOD, said IOD receiving said call and control processing commands in a packet based protocol and conveying said call and control processing commands to said circuit-switched matrix and line interface to allow said circuit-switched matrix and line interface to control access to aid plurality of access nodes, wherein each connection between said access nodes and said MCU traverses said circuit-switched matrix and line interface; and
wherein ones of said plurality of access nodes are selected from the group consisting of:
a digital instrument;
a digital trunk; and
an analog trunk.

11. The method as recited in claim 10 wherein said MCU and said IOD communicate employing a User Datagram Protocol (UDP).

12. The method as recited in claim 10 wherein said MCU and said IOD are geographically separated.

13. The method as recited in claim 10 further comprising coupling an application server to said MCU.

14. The method as recited in claim 10 wherein said MCU is a primary MCU, said distributed switching platform further comprising a secondary MCU coupled to said IP network.

15. The method as recited in claim 14 wherein said primary and secondary MCUs are geographically separated.

16. The method as recited in claim 14 wherein only one of said primary and secondary MCUs provides said call and control processing commands at any time, said one of said primary and secondary MCUs being in control of said distributed switching platform.

17. The method as recited in claim 16 further comprising updating a database associated with at least one of said one of said primary and secondary MCUs.

18. The method as recited in claim 10 further comprising:
coupling a second IOD to said IP network; and
providing an interface to additional access nodes via a second circuit switched matrix and line interface coupled to said second IOD.

19. A distributed switching platform means coupled to an Internet Protocol (IP) network, comprising:
a main control unit (MCU) means, coupled to said IP network, that generates call and control processing commands;
a switching partition means coupled to said IP network and including:
an input-output distributor (IOD) means configured to receive said call and control processing commands in a packet based protocol, and
a circuit-switched matrix and line interface means, coupled to said IOD, that provides a sole interface between a plurality of access nodes and said MCU means, said IOD means conveying said call and control processing commands to said circuit-switched matrix and line interface means to allow, based thereon, said circuit-switched matrix and line interface means to control access to said plurality of access nodes; and
wherein ones of said plurality of access nodes are selected from the group consisting of:
a digital instrument;
an analog instrument;
a digital trunk; and
an analog trunk.

20. The distributed switching platform means as recited in claim 19 wherein said MCU means and said switching partition means are adapted to communicate employing a User Datagram Protocol (UDP).

21. The distributed switching platform means as recited in claim 19 wherein said MCU means and said switching partition means are geographically separable.

22. The distributed switching platform means as recited in claim 19 further comprising an application server means coupled to said MCU.

23. The distributed switching platform means as recited in claim 19 wherein said MCU means is a primary MCU means, said distributed switching platform means further comprising a secondary MCU means coupled to said IP network.

24. The distributed switching platform means as recited in claim 23 wherein said primary and secondary MCU means are geographically separated.

25. The distributed switching platform means as recited in claim 23 wherein only one of said primary and secondary MCU means provides said call and control processing commands at any time, said one of said primary and secondary MCU means being in control of said distributed switching platform means.

26. The distributed switching platform means as recited in claim 25 wherein said one of said primary and secondary MCU means which is in control of said distributed switching platform means updates a database means associated with said other one of said primary and secondary MCU means.

27. The distributed switching platform as recited in claim 19 further comprising a second switching partition means coupled to said IP network and including:
a second IOD means, and
a second circuit-switched matrix and line interface means, coupled to said second IOD means, that provides an interface to additional access nodes.

28. An enterprise call center coupled to an Internet Protocol (IP) network, comprising:

a primary main control unit (MCU) coupled to a first location associated with said IP network;

a secondary MCU coupled to a second location associated with said IP network, at least one of said primary and secondary MCUs generating call and control processing commands;

a first switching partition coupled to said IP network and including:

an input-output distributor (IOD) configured to receive said call and control processing commands in a packet based protocol; and a circuit-switched matrix and line interface coupled to said IOD, that provides a sole interface between a plurality of access nodes and said primary and secondary MCUs, said IOD conveying said call and control processing commands to said circuit-switched matrix and line interface to allow, based thereon, said circuit-switched matrix and line interface to control access to said plurality of access nodes, wherein each connection between said access nodes and said MCU traverses said circuit-switched matrix and line interface; and wherein ones of said plurality of access nodes are selected from the group consisting of:

a digital instrument;

an analog instrument;

a digital trunk; and an analog trunk.

29. The enterprise call center as recited in claim 28 wherein said primary and secondary MCUs and said first switching partition communicate employing a User Datagram Protocol (UDP).

30. The enterprise call center as recited in claim 28 wherein said first switching partition is coupled to a third location associated with said IP network.

31. The enterprise call center as recited in claim 28 further comprising an application server coupled to at least one of said primary and secondary MCUs.

32. The enterprise call center as recited in claim 28 wherein only one of said primary and secondary MCUs provides said call and control processing commands at any time, said one of said primary and secondary MCUs being in control of said enterprise call center.

33. The enterprise call center as recited in claim 32 wherein said one of said primary and secondary MCUs which is in control of said enterprise call center updates a database associated with said other one of said primary and secondary MCUs.

34. The enterprise call center as recited in claim 28 wherein said enterprise call center is coupled to a Public Switched Telephone Network (PSTN) via one of said plurality of access nodes.

35. The enterprise call center as recited in claim 28 further comprising a second switching partition coupled to said IP network, including:

a second IOD, and a second circuit-switched matrix and line interface, coupled to said second IOD, that provides an interface to additional access nodes.

36. The enterprise call center as recited in claim 28 wherein at least one of said primary and secondary MCUs and said switching partition are embodied in a sequence of instructions executable on a general purpose computer system.

* * * * *